United States Patent [19]
Arnberger

[11] Patent Number: 5,282,661
[45] Date of Patent: Feb. 1, 1994

[54] COLLAPSIBLE DRIVER'S CAB FOR A TRUCK

[75] Inventor: Alois Arnberger, Steyr, Austria

[73] Assignee: Steyr-Daimler-Puch AG, Wien, Austria

[21] Appl. No.: 906,533

[22] Filed: Jun. 30, 1992

[51] Int. Cl.⁵ .......................................... B62D 33/06
[52] U.S. Cl. ...................... 296/27; 296/190; 180/89.12
[58] Field of Search ................ 296/27, 190; 180/89.12

[56] References Cited

U.S. PATENT DOCUMENTS

| | | | |
|---|---|---|---|
| 770,773 | 9/1904 | McGuirk et al. | 290/27 |
| 912,430 | 2/1909 | Smither | 296/27 |
| 3,050,331 | 8/1962 | Mansen | 296/27 |
| 3,284,129 | 11/1966 | Jaulmes | 296/27 |
| 3,458,232 | 7/1969 | Frank | 296/27 |
| 3,768,855 | 10/1973 | Lave | 296/27 |
| 3,823,974 | 7/1974 | Patnode | 296/27 X |
| 4,619,479 | 10/1986 | Martin, Jr. | 296/190 |
| 4,842,326 | 6/1989 | DiVito | 296/196 |
| 5,016,935 | 5/1991 | Semple | 296/27 X |

FOREIGN PATENT DOCUMENTS 2133356 7/1984 United Kingdom ................ 296/190

*Primary Examiner*—Dennis H. Pedder
*Attorney, Agent, or Firm*—Meltzer, Lippe, Goldstein et al.

[57] ABSTRACT

A collapsible truck cab suitable for military use, especially by airborne combat units, comprises a box-like structure including side walls, side doors, a front wall, and a rear wall, each of which is divided into upper parts and lower parts, and a removable roof of high flexural and torsional stiffness. The upper parts of the wall panels are connected to the lower parts by hinges so that the cab can assume a collapsed position by removing the roof and swinging the upper parts down. A plurality of attachment elements, such as quick action latches, are distributed throughout the cab and are used to snap the wall panels and the roof together. Centering cones and centering troughs are also distributed on contact faces of the roof and the wall panels so that precise alignment of the parts is not required.

8 Claims, 4 Drawing Sheets

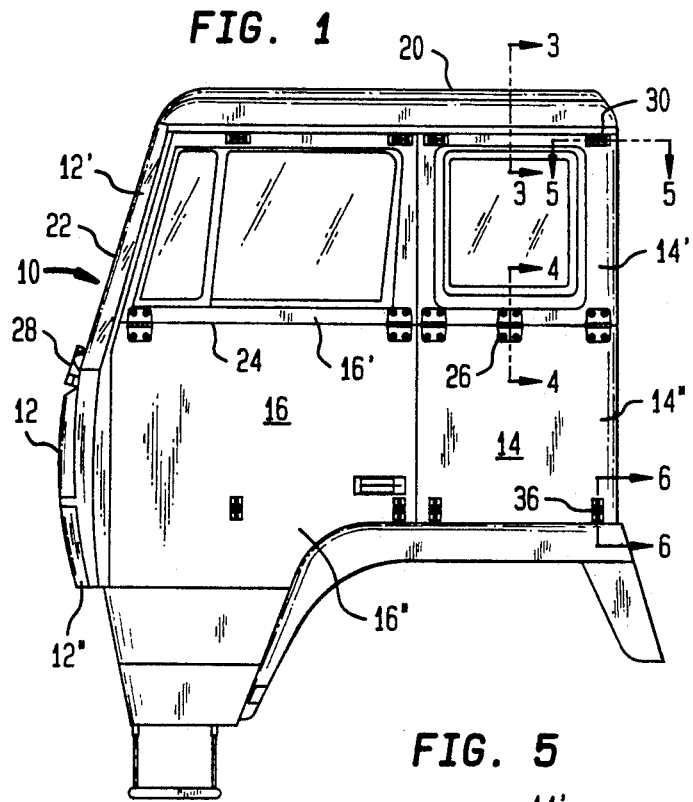
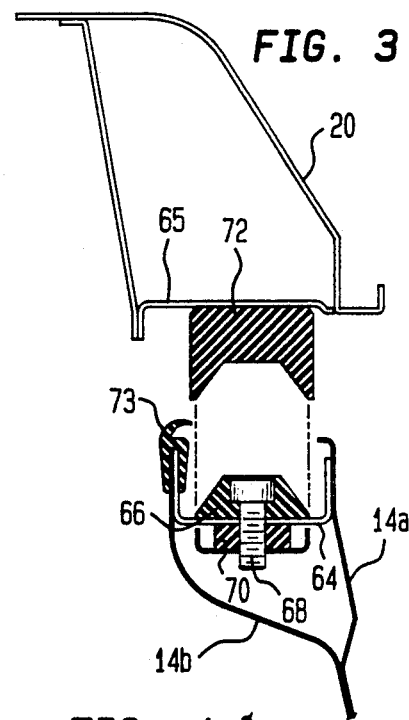
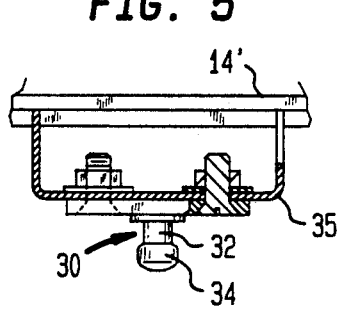
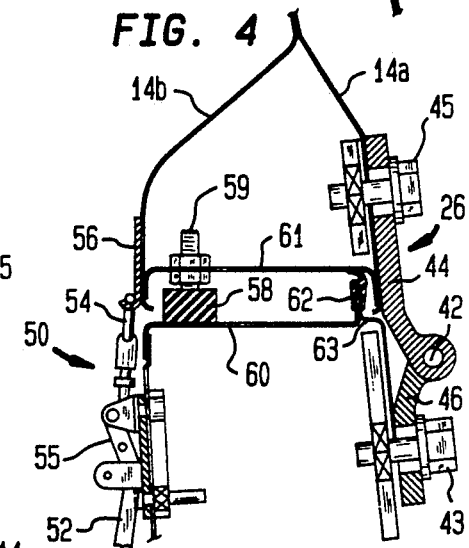
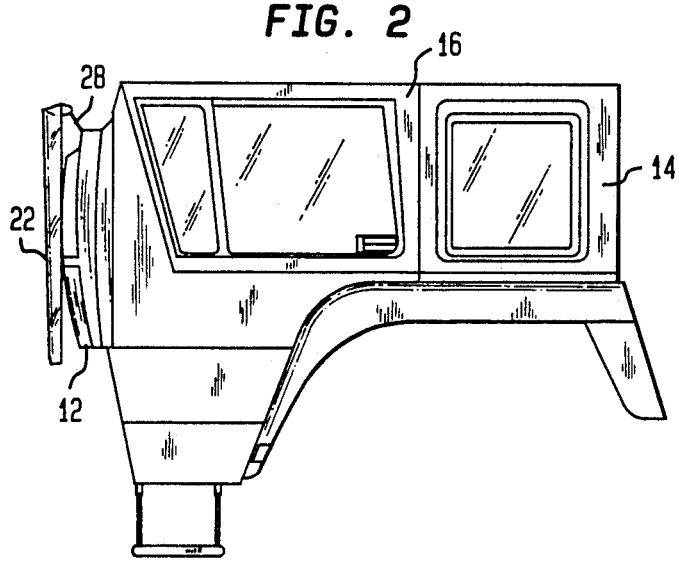
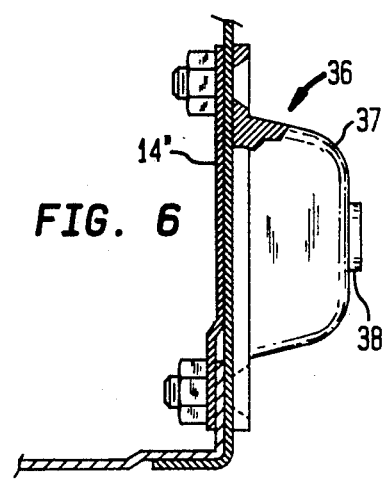

COLLAPSIBLE DRIVER'S CAB FOR A TRUCK

BACKGROUND OF THE INVENTION

The present invention relates to a collapsible driver's cab for a truck. More particularly, the present invention relates to a collapsible driver's cab for a military truck which, because of its collapsibility, can be converted into a compact unit and transported into a combat zone where it can be reassembled quickly and put to immediate use.

A conventional driver's cab for a truck comprises a front wall with a windshield, two side walls, two doors adjacent each of the side walls, a rear wall, a roof, and an understructure which is linked to the chassis of a truck by elastic connecting elements. Such a truck cab is a stiff, box-like structure.

For military purposes, it is desirable that the truck cabs be collapsible into compact units. In particular, it is desirable if the height of the truck cabs can be significantly reduced so that they can be transported to a remote location, for example, to a combat zone, either by air or by ship.

This is especially true in the case of truck cabs to be used by military airborne units wherein the height of the aircraft loading space and of the loading door is limited. Furthermore, unloading of such truck cabs is often from an aircraft hovering slightly off the ground at or near a combat zone. As a result, it is also necessary that the truck cab be suitably insensitive to the shock of unloading from a low height. For military airborne units, it is of course essential that the truck cabs be quickly assembled into vehicles ready for combat use after they are unloaded from the aircraft.

Until now, truck cabs having a soft collapsible canvas roof and a tiltable windshield have been used by military airborne units. However, such cabs have certain disadvantages. For example, because of the soft canvas roof, it is not possible to mount an anti-aircraft gun on the roof of the cabs. Additionally, the roof of the cabs does not provide protection against atmospheric conditions, such as poison gas or radiation.

It is therefore an object of the present invention to provide an improved collapsible driver's cab for a truck, especially a military truck which is suitable for use by airborne combat units. In particular, it is an object of the present invention to provide a collapsible driver's cab which meets the following set of criteria: the cab should be constructed with collapsible upper wall panels which can be lowered when the cab is to be loaded for transport; the cab, including the roof, should have a high load carrying capacity so that an anti-aircraft gun can be mounted on the roof; the cab should be capable of rapid assembly so that it can be put into service immediately after unloading; the cab should provide adequate protection against heat, cold and hazardous atmospheric conditions; and the cab should have sufficient structural strength so that it can be used in off the road service.

SUMMARY OF THE INVENTION

This object is achieved in the collapsible cab of the present invention which provides a stiff, box-like structure comprising side walls, side doors, a front wall, and a rear wall, each of which is divided horizontally into an upper part and a lower part, the upper parts being attached by hinges to the lower parts so that each upper part can be swung down into a collapsed position suitable for transport of the cab. The stiff, box-like structure further includes a removable roof of high flexural and torsional stiffness which is attached to the upper wall panels by means of a plurality of attachment elements, such as latches. Furthermore, disposed on the contact faces of the wall panels and the roof are a plurality of centering cones and centering troughs. The centering cones and centering troughs mate with each other so as to ensure proper seating of the wall panels and the roof and so as to accommodate shear forces in order to ensure torsional stiffness of the cab.

The collapsible cab of the present invention can be in an assembled state or in a collapsed state. In the collapsed state, the roof is removed and the upper wall panels and the windshield are swung down. In this state, the cab can be transported. In the assembled state, the upper wall panels and the windshield are swung up and fixed into position, and the roof is mounted on the upper wall panels. In this state, an anti-aircraft gun can be mounted on the roof and the cab is ready to be put into use.

A collapsible truck cab in accordance with the present invention has a number of advantages over the collapsible truck cabs of the prior art. First, the collapsible cab of the present invention can be constructed from the wall panels of conventional cabs by cutting the wall panels along a horizontal plane and fitting the divided wall panels with a set of hinges. This keeps production costs low. Furthermore, the use of hinges allows the upper wall panels to be swung down into the collapsed transport position without removing them from their proper locations. When the cab is delivered to a combat zone, these upper wall panels can be swung up again for rapid re-assembly without any further adjustment. Therefore, they can be readied for service in an exceedingly short time.

Second, the use of mating centering cones and centering troughs on the contact faces of the wall units and the roof helps to align the upper wall panels and the roof. The centering cones and troughs are essential to accommodate shear forces which occur between the contact faces when the closed cab is exposed to torsion in off-the-road service.

Third, the use of a roof having high flexural and torsional stiffness, for example, by making the roof from drawn sheet metal and providing it with strengthening ribs, provides resistance to buckling of the roof structure and therewith contributes to torsional rigidity of the entire cab. Such a roof also increase the load carrying capacity of the cab and permits a ring mount for an anti-aircraft gun to be placed on the roof.

These three features of the invention are particularly important for achieving the aforesaid object of the invention. Preferred embodiments of the invention provide further advantages over the prior art.

In one preferred embodiment of the invention, the attachment elements by means of which the roof is snapped into place and the wall units held together so as to form the stiff, box-like structure, are quick action bolts or, more preferably, tension locks or latches. The use of such quick action attachment elements allows the cab to be assembled quickly and to be put into service very rapidly.

In a further preferred embodiment of the invention, associated with the hinges connecting the upper parts of the wall panels to the lower parts are adjustable rubber buffers and sealing strips. The buffers help position the upper parts into the correct angular position for fitting the roof and, to this end, are placed on the far side of the hinges. The sealing strips are provided for protecting passengers from hazardous atmospheric conditions and are therefore strategically installed adjacent to the hinges where contact pressure is high and deformations are low, making for longevity of the seals.

In a further preferred embodiment of the invention, the hinges are located on the outside of the cab structure so that the upper wall panels can be swung down to the outside of the cab. The upper wall panels are provided on their outside surfaces with retaining pins which are received in retainer buffers located in the lower wall panels when the upper wall panels are swung down. This prevents the upper wall panels from swinging loosely when the cab is being transported. Furthermore, the retainer buffers are made from rubber so that they act somewhat as shock absorbers which helps prevent the windows and windshield from shattering when the collapsed cabs are unloaded from hovering aircraft.

In a further preferred embodiment of the invention, many of the hinges are combined with tension locks, e.g., latches, located on inside surfaces of the cab structure. The previously mentioned rubber buffers associated with the hinges are positioned closer to the tension locks than to the hinges. This arrangement permits stiff positioning against the buffers. It also allows dimensioning the tension locks for high tension which contributes to the rigidity of the entire cab structure and strong support for the roof with ring mount.

In a further preferred embodiment of the invention, many of the centering cones and centering troughs (e.g., those located on the rear wall and upper wall panels) are also combined with tension locks in the vicinity of the centering cones and troughs. As such tension locks can be engaged rapidly, many can be employed in the collapsible truck cab of the present invention. Positioning the tension locks in the vicinity of the centering cones and troughs avoids bending moments in the parts that are joined together, which is of especial advantage for windows. The tension of the tension locks acts to pull the cones into their mating centering troughs.

In a further preferred embodiment of the invention, the roof is constructed from two stamped or deep drawn metal sheets, the lower sheet being provided with longitudinal ribs whose crests are fixed to the upper sheet. The ring mount is a bent open profile with an upper flange and a cylindrical sleeve, the upper sheet being joined (e.g., by spot welding) to the upper flange, and the lower sheet being joined in a similar manner to the sleeve. Such a construction of the roof from two sheets with longitudinal ribs and a flange of the ring mount makes for high flexural stiffness and load carrying capacity in spite of the opening. The longitudinal direction of the ribs also adds torsional stiffness to the entire cab structure.

BRIEF DESCRIPTION OF THE DRAWINGS

FIG. 1 is a side elevational view of a preferred embodiment of the truck cab of the present invention in its assembled state.

FIG. 2 is a side elevational view of the inventive truck cab in its collapsed state with the roof removed.

FIG. 3 is an enlarged sectional view of a detail of the inventive truck cab taken along line 3—3 of FIG. 1.

FIG. 4 is an enlarged sectional view of a detail of the inventive truck cab taken along line 4—4 of FIG 1.

FIG. 5 is an enlarged sectional view of a detail of the inventive truck cab taken along line 5—5 of FIG 1.

FIG. 6 is an enlarged sectional view of a detail of the inventive truck cab taken along line 6—6 of FIG. 1.

DETAILED DESCRIPTION OF THE INVENTION

Figure 7:
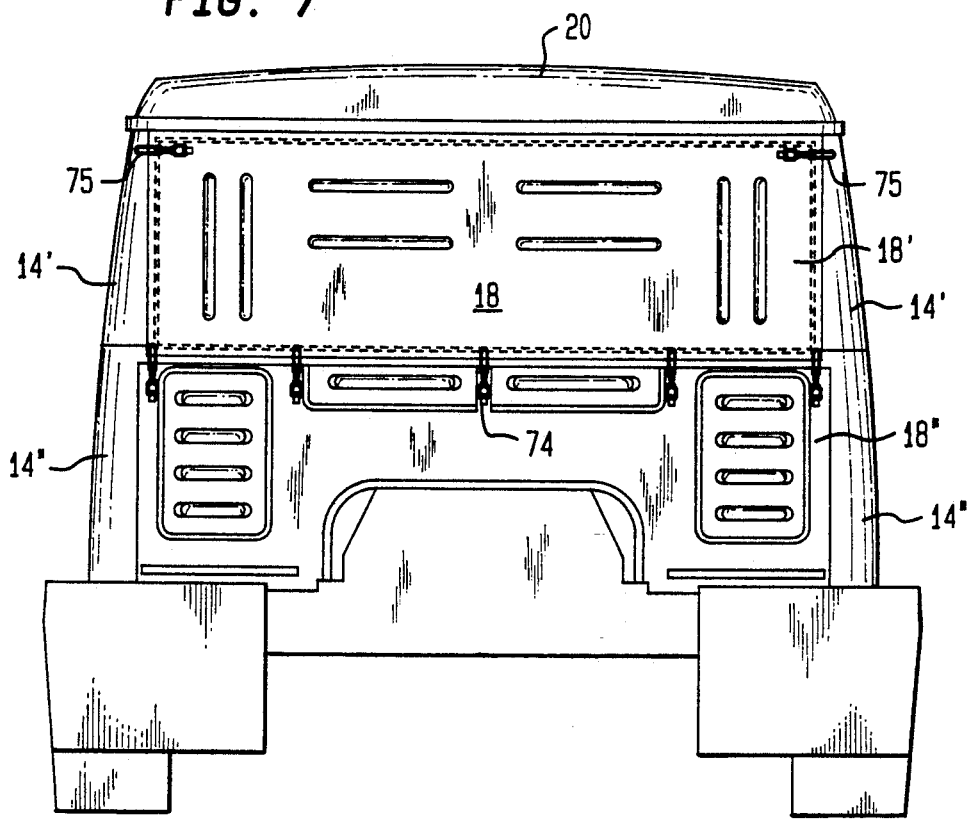
FIG. 7 is a rear elevational view of the inventive truck cab shown in FIG. 1.

Referring first to FIG. 1, a collapsible truck cab 10 according to the present invention is illustrated. The cab 10 comprises a front wall 12, a pair of side walls 14, a pair of side doors 16 adjacent to the side walls, a rear wall 18 (see FIG. 7) and a removable roof 20. A windshield 22 is supported in the front wall 12. Disposed on the inside and outside surfaces of the cab 10 are a plurality of attachment elements and tilting elements (discussed in detail below) which enable the cab to be collapsed into a transport position (see FIG. 2) and to be quickly reassembled into the stiff box-like structure illustrated in FIG. 1.

The side walls 14, side doors 16, and the rear wall 18 are of a substantially conventional nature except that they have been divided along a horizontal plane 24 into upper wall panels 14', 16' and 18', and lower wall panels 14", 16" and 18" of the side walls, side doors, and rear wall, respectively. Hinges 26 are located on the outside of sidewalls 14 and side doors 16. The front wall is also divided into an upper part 12' and a lower part 12" connected to each other by hinges 28. With the roof 20 removed, the upper wall panels 14' and 16', and the windshield 22 in the upper front wall 12', can be swung down about their respective hinges so that the truck cab 20 can assume a collapsed position which is more convenient for transport purposes. This collapsed position is illustrated in FIG. 2. As can be seen therein, the upper wall panels 14' and 16' of the side walls and side doors overlie the respective lower parts 14" and 16", while the windshield 22 in the upper front wall 12' rests against the lower part 12" of the front wall 12. Thus, the height of the truck cab 10 is significantly reduced in this collapsed position which is much more convenient for transport purposes.

Also disposed on the outside of sidewalls 14 and side doors 16 are a plurality of retainer pins 30 and retainer buffers 36. A typical retainer pin 30 is shown in detail in FIG. 5. It is conventional in nature comprising a pedestal 32 terminating in a bulb 34. The retainer pins 30 are attached near the top of the upper wall panels 14' and 16' by means of a mounting 35 and project outwardly therefrom. Retainer buffers 36 made from rubber are mounted near the bottom of lower wall panels 14" and 16". A typical retainer buffer 36, comprising a housing 37 which projects outwardly from the wall and a rubber collar 38, is shown in FIG. 6. When the upper wall panels 14' and 16' are swung down about the hinges 26 into the collapsed position shown in FIG. 2, the retainer pins 30 are received with interference into the collars of the retainer buffers 36 in order to prevent loose swinging of the upper wall panels.

Referring next to FIG. 4, a sectional view taken along line 4—4 of FIG. 1 showing the combination of a hinge 26 mounted on the outside of the wall panels and a tension lock or latch 50 mounted on the inside of the wall panels is illustrated. The side wall 14 is a dual wall structure comprising an outer wall 14a and an inner wall 14b. In a similar manner, the side walls, front wall and rear wall are also dual wall structures. The hinge 26 comprises a first hinge arm 46 attached to the outer wall 14a of the lower wall panel 14" by means of bolts 43, and a second hinge arm 44 attached to the outer wall 14a of the upper wall panel 14' by means of bolts 45. The second hinge arm 44 is pivotable about the hinge pin 42 in a clockwise direction (as shown in FIG. 4) so that the upper wall panel 14' will overlie the lower wall panel 14" in the collapsed position shown in FIG. 2.

Figure 11:
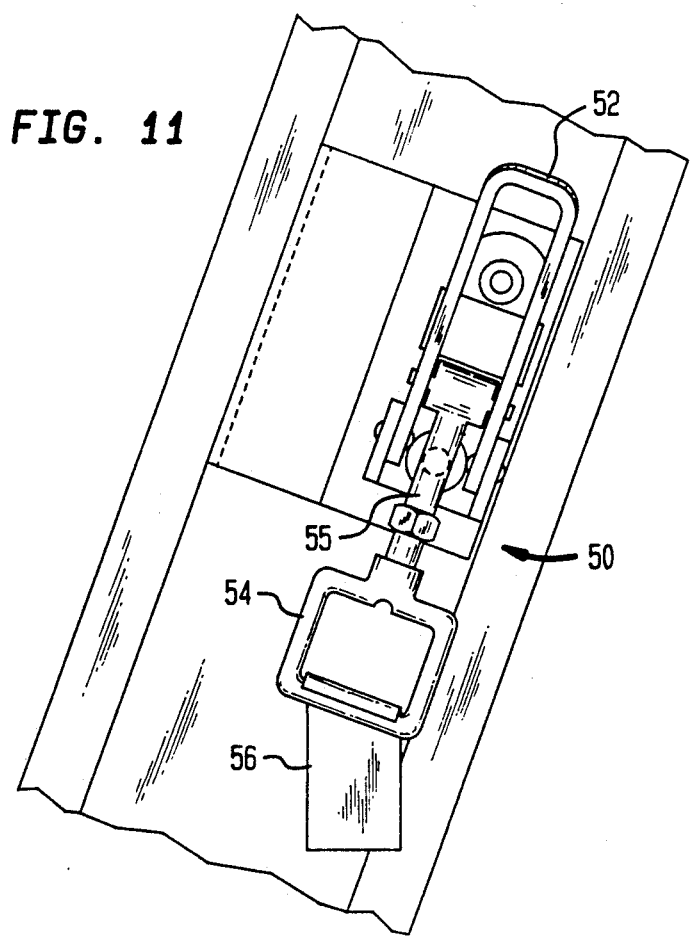
FIG. 11 is a frontal view of a preferred form of attachment element.

Mounted on the inside surface of the inner wall 14b of side wall 14 is a tension lock or latch 50 which operates to lock the upper wall panel 14' into place when the cab 10 is assembled. The latch 50 is conventional and is conveniently seen in FIGS. 4 and 11. It comprises a U-shaped handle 52 connected to a latch band 54 by means of a movable connecting rod 55. The handle 52 is attached to lower wall panel 14", while a latch hook 56 designed to receive the latch band 54 is attached to the upper wall panel 14'. For assembly of the cab, the upper wall panel 14' is swung up about the hinge pin 46 into the position shown in FIG. 1, the latch band 54 is positioned within the latch hook 56, and the latch handle 52 is snapped towards the inner surface of wall 14. This causes the connecting rod 55 to pull the latch band 54 downward (as seen in FIG. 4) into the latch hook 56. Thereby, a very high tensioning force is exerted on the structure and keeps the upper wall panel 14' in its assembled position. Similar hinge and latch combinations are distributed around the cab 10 where the upper and lower panels meet.

Adjacent to the latches 50, towards the inner wall 14b, are rubber buffers 58, an example of which is illustrated in FIG. 4. The rubber buffer 58 is mounted by means of a bolt 59 on a reinforcing profile 61 which connects the outer wall 14a and the inner wall 14b of the lower side wall 14". When an upper wall panel 14' is swung into its assembled position, the rubber buffer 58 is pressed against reinforcing profile 60 of the lower wall panel 14". In addition, a sealing strip 62 attached to the reinforcing profile 60 and located adjacent the hinge 26 is pressed against reinforcing profile 61. The rubber buffer 58 provides angular positioning and a certain degree of elasticity at the juncture of the upper wall panel 14' with the lower wall panel 14". This helps in positioning the upper wall panel relative to the lower wall panel for rapid assembly. The elasticity of rubber buffer 58 also allows a high tensioning force to be applied by the latch 50. At the same time, the sealing strip 62 prevents hazardous atmospheric contaminants, such as poison gas and radiation, from penetrating into the interior of the cab 10 along the juncture of the wall panels. Being nearer to the hinge 26 than the buffer 58, the sealing strip 62 affords good sealing with little deformation.

Referring next to FIG. 3, a contact surface 64 of the upper wall panel 14' which is adjacent to the roof 20 is shown. Mounted on the contact surface 64 is a rubber centering cone 66 which is held in place by means of a bolt 68 and a rubber washer 70. Disposed opposite the centering cone 66 on a contact surface 65 of the roof 20 is a rubber bar or individual blocks of harder rubber which form the centering troughs 72. As at all other junctures, a sealing strip 73 is provided at the juncture of the roof 20 with the upper wall panel 14'. When the roof 20 is placed on top of the upper wall panels, the centering trough 72 comes to rest on top of the centering cone 66. As both of these elements are made from a rather hard rubber they provide precise positioning of the roof on top of the upper wall panels and accommodate shear forces between side panel and roof. Similar combinations of centering cones and centering troughs are distributed on various contact surfaces of the roof 20 and the upper wall panel.

FIG. 7 shows the rear wall 18 of the truck cab 10. The rear wall 18 is divided into an upper rear wall panel 18' and a lower rear wall panel 18" connected to each other by a plurality of hinges. In the case of the rear wall, the hinges are mounted in the interior of the cab and therefore are not shown. Associated with the interior hinges of rear wall 18 are latches 74 located on the exterior of the cab. Horizontally oriented latches 75 are also located near the top of the rear wall 18 on the outside of the cab. The latches 75 are employed to connect the upper rear wall panel 18' to the upper side wall panels 14'. Centering cones and centering troughs (not shown) are located in interior contact faces in the vicinity of the latches 75 in order to enhance positioning of these wall panels. In the case of the rear wall 18, the upper rear wall panel 18' does not overlie the lower rear wall panel 18" when the cab is in the collapsed position. Rather, the upper rear wall panel 18' swings down towards the interior of the cab. Suitably positioned interior retainer pins and retaining buffers (not shown) keep the upper rear wall panel 18' in place when the cab is in the collapsed position shown in FIG. 2.

Figure 8:
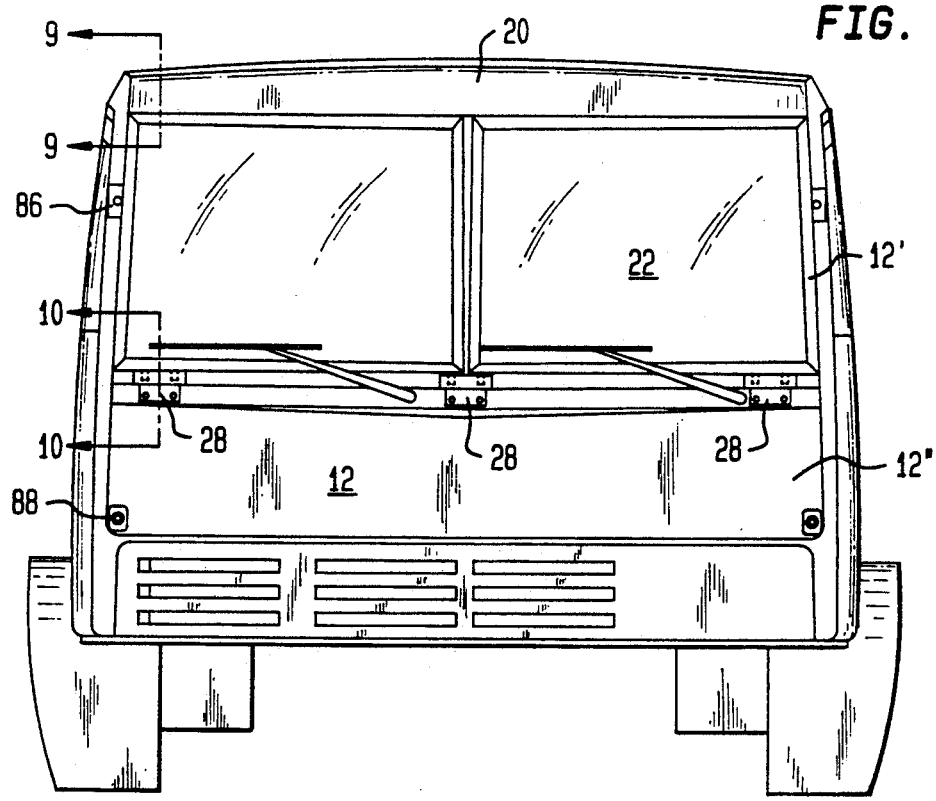
FIG. 8 is a front elevational view of the inventive truck cab shown in FIG. 1.
Figure 10:
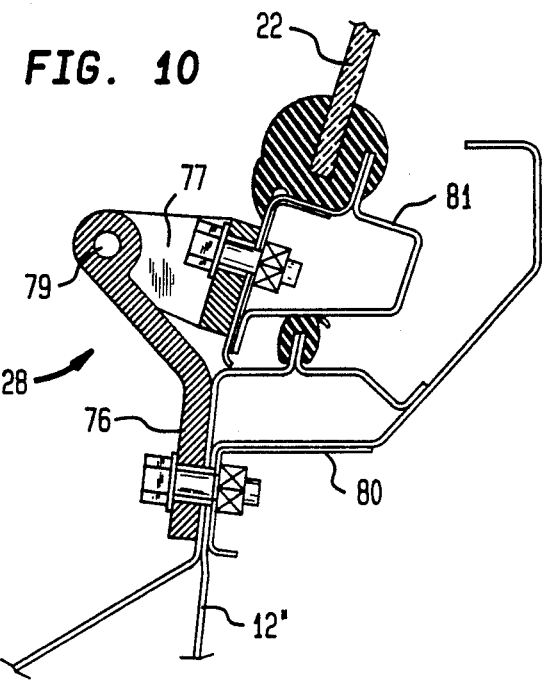
FIG 10 is an enlarged sectional view of a detail of the inventive truck cab taken along line 10—10 of FIG. 1.

Turning now to FIG. 8, a frontal view of the cab 10 is shown. The front wall 12 is divided into an upper part 12' and a lower part 12". The windshield 22 is mounted in the upper front wall 12' by means of the hinges 28. An enlarged view of one of the hinges 28 is shown in FIG. 10. As can be seen therein, one arm 76 of hinge 28 is attached to a profiled structure 80 of the lower front wall 12,,, while a second arm 77 of hinge 28 is attached to a second profiled structure 81 which supports the windshield 22. The second hinge arm 77 together with windshield 22 are capable of pivoting about the hinge pin 79 in a counterclockwise direction (as shown in FIG. 10) so that the windshield 22 can be swung downwardly into the position shown in FIG. 2 for transport. Retainer pins 86 (see FIG. 8) disposed along the edge of upper front wall 12' are received within retaining buffers 88 in the lower front wall 12" when the windshield 22 is swung down into the collapsed position.

Figure 9:
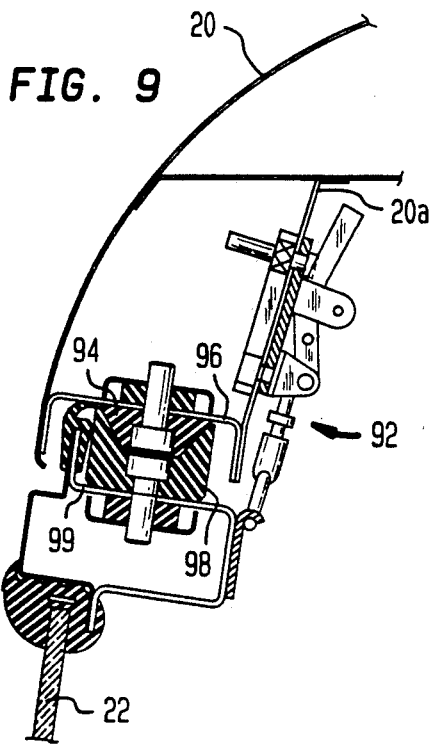
FIG. 9 is an enlarged sectional view of a detail of the inventive truck cab taken along line 9—9 of FIG. 1.

FIG. 9 shows in detail a typical connection between the roof 20 and the upper front wall 12'. Disposed along an inner wall 20a of the roof 20 is a latch 92 similar to that shown in FIG. 4. A centering cone 94 is carried on the contact surface 96 of the roof 20 while a centering block or bar with troughs 98 is carried on a contact surface 99 of the upper front wall 12'. When the roof 20 is mounted on the wall units, the centering cone 94 seats into the centering trough 98 of the upper front wall 12' and the latch 92 locks these units into the assembled position.

Figure 12:
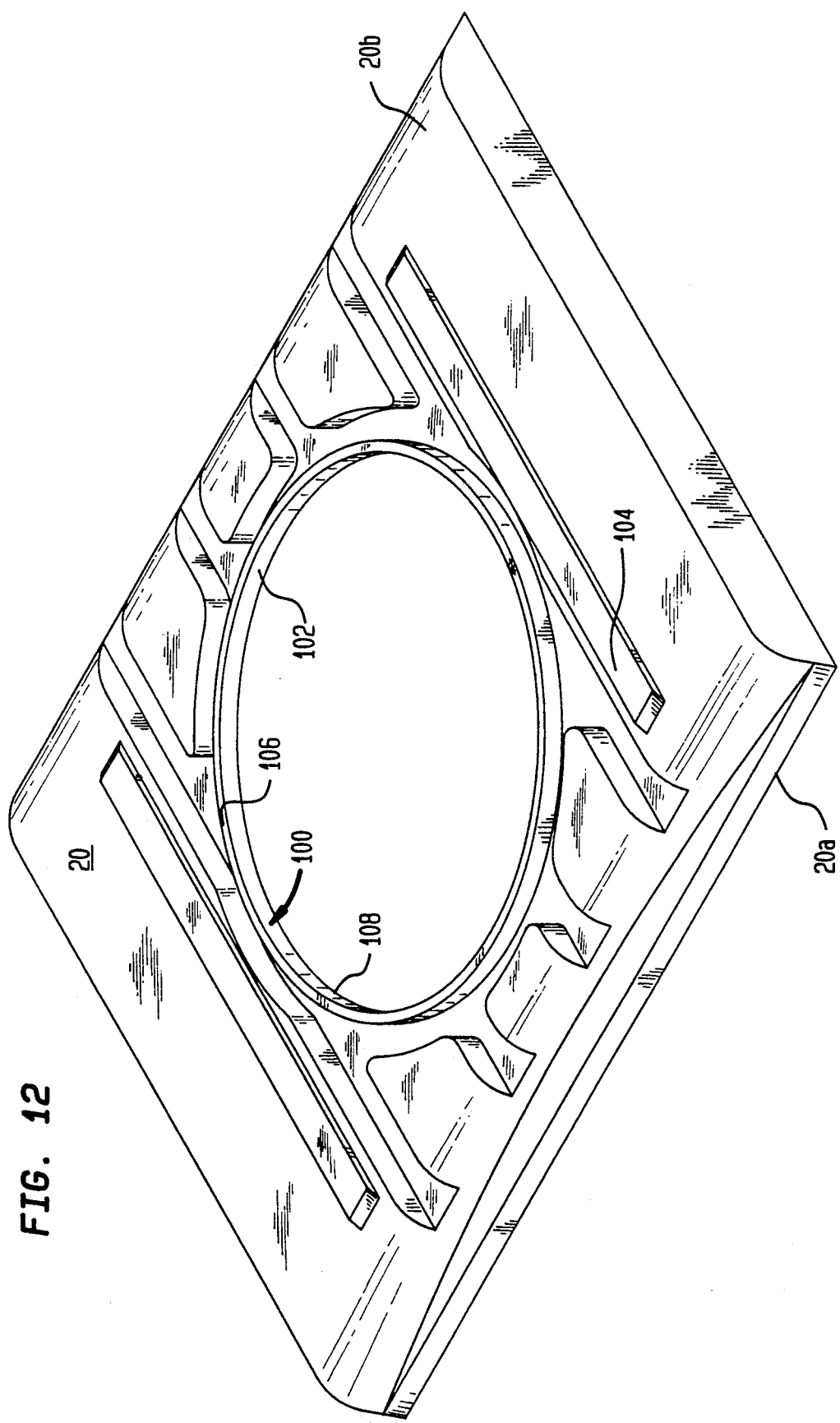
FIG. 12 is a perspective view of the roof of the inventive truck cab.

FIG. 12 shows the roof 20 which carries a ring mount 100 for an anti-aircraft gun. The roof 20 comprises an inner panel 20a and an outer panel 20b. For the sake of clarity, the outer panel is assumed transparent in FIG. 12. The inner wall 20a is a deep drawn structure with a longitudinal ridges 104, the crests of the longitudinal ridges 104 being welded to the outer panel 20b thereby providing increased flexural stiffness and load carrying capacity to the roof. The ring mount itself is an integral structure comprising an upper flange 106 welded to the outer roof panel 20b and a cylindrical sleeve 102 welded to the inner panel 20a. The ring mount 100 is a rigid structure capable of supporting an anti-aircraft gun. The center of ring mount 100 is empty space enabling a person to operate the anti-aircraft gun (not shown) mounted on the ring mount from inside the cab.

Thus, a collapsible truck cab which is suitable for military use has been described. The cab is capable of being collapsed into a compact transport position and reassembled quickly when dropped into a combat zone. The cab has a high load carrying capacity so that an anti-aircraft gun can be mounted on its roof.

While the invention has been described by reference to a specific embodiment, this was for purposes of illustration only. Numerous alternative embodiments will be apparent to those skilled in the art and are considered to be within the scope of the invention.

I claim:

1. A collapsible driver's cab for a truck, comprising
a box-like structure including side walls, side doors, a front wall, and a rear wall, each of which is divided horizontally into upper parts and lower parts,
hinging means for hingedly connecting said upper parts to said lower parts so that said driver's cab can assume an uncollapsed box-like configuration, and so that said driver's cab can assume a collapsed configuration wherein said upper parts of said side walls, side doors, and front wall are pivoted down to lie substantially flat in a vertical position against exterior surfaces of their respective lower parts,
a rigid removable roof detachably connected to said upper parts,
a plurality of mating centering cones and centering troughs disposed on contact faces of said upper parts and said roof, and
a plurality of attachment means for attaching said front wall, said side walls, said side doors, said front wall, and rear wall, and said roof together into said box-like structure.

2. The cab of claim 1 wherein said roof includes a gun ring mount.

3. The cab of claim 1 wherein said roof is a dual wall structure with longitudinal ribs in the interior of said roof.

4. The cab of claim 1 wherein said attachment means comprises a latch.

5. The cab of claim 1 further comprising sealing means for sealing said cab from atmospheric conditions, said sealing means being located near said hinging means.

6. The cab of claim 1 further comprising positioning buffers associated with and located near said hinging means.

7. The cab of claim 1 wherein said attachment means are located near said centering cones and centering troughs.

8. The cab of claim 1 further comprising retaining means for retaining said upper parts in said collapsed configuration.

* * * * *